United States Patent [19]

Ross

[11] Patent Number: 5,488,293

[45] Date of Patent: Jan. 30, 1996

[54] METHOD OF CALIBRATING A MAGNETIC CHARACTER BEARING DOCUMENT

[76] Inventor: Paul D. Ross, 1107 Birchmount Road, Scarborough, Ontario, Canada, M1K 1S6

[21] Appl. No.: 237,901

[22] Filed: May 4, 1994

Related U.S. Application Data

[63] Continuation of Ser. No. 973,410, Nov. 9, 1992, abandoned.

[51] Int. Cl.$^6$ ............................ G01R 35/00; B07C 5/344; G06K 9/00
[52] U.S. Cl. ............................................. 324/202; 209/569
[58] Field of Search ............................. 324/202; 73/1 R; 209/569

[56] References Cited

U.S. PATENT DOCUMENTS 5,126,547  6/1992  Norman, Jr. ........................ 283/58 X Primary Examiner—Walter E. Snow

[57] ABSTRACT

A method of calibrating a document having a magnetic character on the document comprises measuring by testing equipment, magnetic flux level of a known current passed through a specified conductor to establish a first signal having a first signal strength represented by a unit value, passing the document through the testing equipment to provide a second signal having a second signal strength produced by magnetic flux of the character and assigning a value to the second signal strength in comparison to and shown in units as a percentage of the unit value of the first signal strength.

4 Claims, 3 Drawing Sheets

METHOD OF CALIBRATING A MAGNETIC CHARACTER BEARING DOCUMENT

This is a continuation of now abandoned application Ser. No. 07/973,410, filed Nov. 9, 1992.

FIELD OF THE INVENTION

The present invention relates to a calibration document having an accurately assigned magnetic ink intensity value.

BACKGROUND OF THE INVENTION

Certain documents and in particular negotiable documents are printed with magnetic ink, ribbon or toner for machinery reading purposes. Negotiable documents are printed with what is known as the E-13B MICR font which includes a series of MICR (magnetic ink character recognition) symbols or characters. The magnetic ink printing of these characters provide an electronically readable signal to a machine for reading the document. However, if the signal strength is either too high or too low, the document cannot be read and is rejected from the machine reader. This presents serious problems to cheque printers who must therefore carefully scrutinize magnetic ink levels on the documents that they have printed.

In the past, secondary paper reference documents have been used as a means to calibrate test equipment for assessing whether or not a magnetic ink character recognition document, i.e. a MICR document has an appropriate level of magnetic ink to be readable by a machine reader. In particular, many years ago, the Bank Administration Institute in Chicago produced what were known as secondary reference documents having MICR encoded characters with an optimum signal strength for machine reading purposes. These documents, which were made from primary reference documents, had a known magnetic ink signal strength value, and were fed through test equipment which was then calibrated based on the secondary reference document. Over the decades, further secondary reference documents have been printed off of these primary reference documents and as will be appreciated, through aging of the primary reference documents the secondary reference documents have become less accurate.

SUMMARY OF THE INVENTION

The present invention relates to a primary calibration document replacing the secondary reference document and an accurately reproducible method of assigning MICR signal value to a MICR encoded symbol, replacing the primary reference document concept. In particular, a method of assigning an intensity value to a MICR encoded symbol on a primary document comprises setting up a magnetic flux under controlled conditions, measuring magnetic signal level of the flux to arrive at a reference signal level value, measuring signal level intensity of the symbol on the document and comparing that signal level intensity with the signal level of the magnetic flux reference value. The magnetic ink encoded symbol on the document is then assigned a magnetic ink test equipment calibration value.

The primary document itself includes at least one MICR encoded symbol which according to the method described above has an assigned magnetic ink intensity value established in reference to a controlled electrically generated magnetic flux level.

A printer who prints various different types of MICR encoded documents such as cheques and the like uses the above primary calibration document for the purpose of accurately calibrating MICR test equipment which can then be used with full assurance of the accuracy of the equipment to test MICR level intensity of the documents that have been printed.

BRIEF DESCRIPTION OF THE DRAWINGS

The above as well as other advantages and features of the present invention will be described in greater detail according to the preferred embodiments of the present invention in which.

DETAILED DESCRIPTION OF THE PREFERRED EMBODIMENTS

Figure 1:
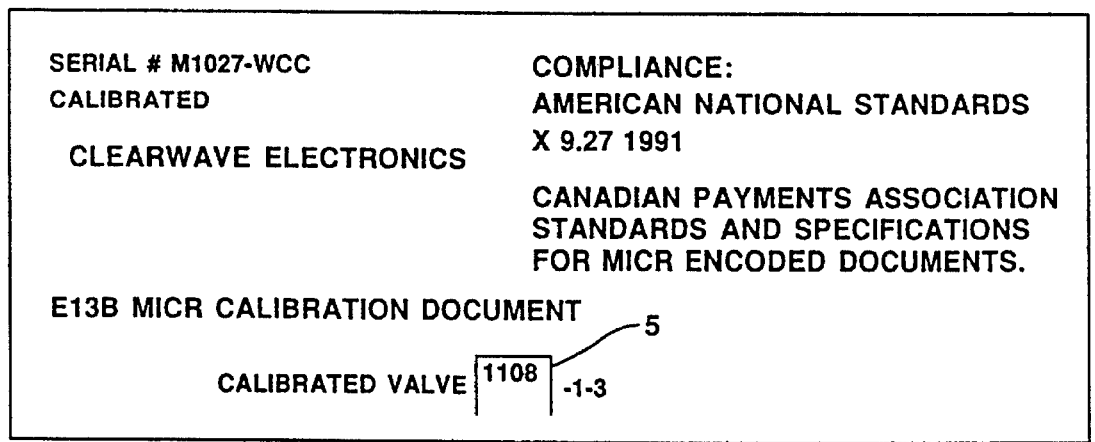
FIG. 1 is a front view of a primary document bearing a MICR encoded ON-US symbol with an assigned or calibrated value determined in accordance with a preferred embodiment of the present invention.

Before going into detail regarding the various specific features of the present invention, it is to be understood that the final product achieved by applicant is a product referred to as a primary calibration document which is used to ensure accurate measurement by MICR reading equipment and in particular, equipment calibrated specifically to read documents bearing a MICR encoded symbol. The primary calibration document itself is first tested to determine a MICR signal level value which is assigned to that document. The calibration document is then fed to the MICR test equipment which is calibrated to comply with the accurate value provided on the calibration document. The now calibrated equipment can be used to assess whether or not MICR printed documents have a MICR intensity in a range acceptable to be read by MICR reading equipment.

The starting point of the entire invention is to establish control conditions for generating a magnetic flux having a flux level which produces a MICR value of 100. This value represents 100 units of signal strength which is the optimum value for MICR printed documents as established by industry norms. Calibration documents made in accordance with the present invention are then compared to the optimum value and assigned a calibrated value.

By way of example of the above, a calibration document generally indicated at 1 which is printed on a paper backing of a shape and size similar to most cheques, has a MICR encoded ON-US symbol 3 with a calibrated value of 108 indicated in area 5 on calibration document 1. Details as to how the calibrated value 108, which is only 8% greater than the optimum value, is arrived at are described later in the application.

Figure 2:
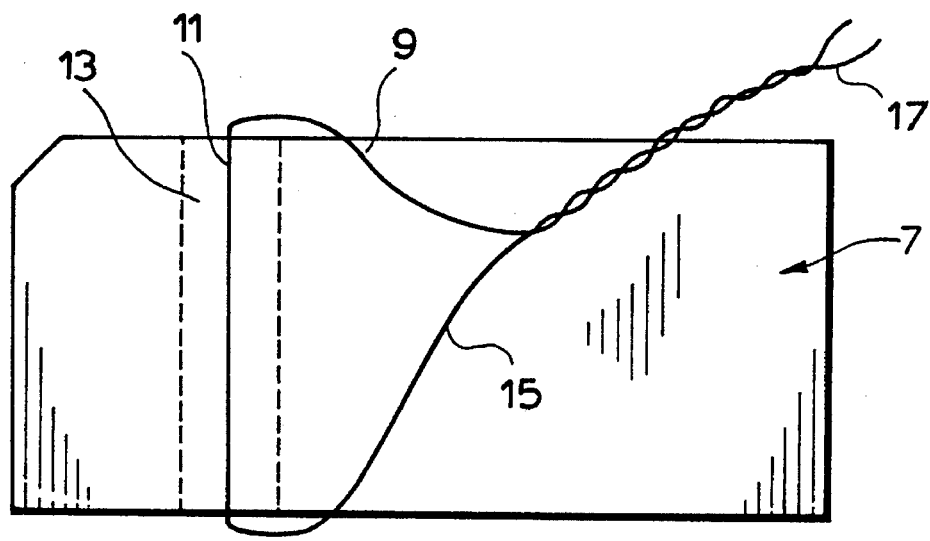
FIG. 2 is a front view of a piece of equipment through which an electrical current is passed to produce a magnetic flux having an intensity which is measured to provide a reference value from which the calibrated value on the primary document is established.

FIG. 2 shows what is referred to as a wire card generally indicated at 7. This wire card in its preferred construction comprises a stiff paper card backing 9 to which a straight cylindrical conductor or wire 11 is secured by means of tape 13. An electrical current is fed through the conductor 11 by means of electrical lines 15 connected to a drive current input 17.

Again, according to the preferred construction, the conductor has a diameter which is equivalent to the standard dimensions of AMERICAN WIRE GAUGE B&S GAUGE #28 ANNEALED COPPER of 0.32 mm in diameter. The tape should be no thicker than 0.002 inches. In addition, a 100 ohm resistor (+ or − 1 percent, 0.1 watt) may be connected in series with one end of the wire to facilitate current measurement across the wire.

Figure 3:
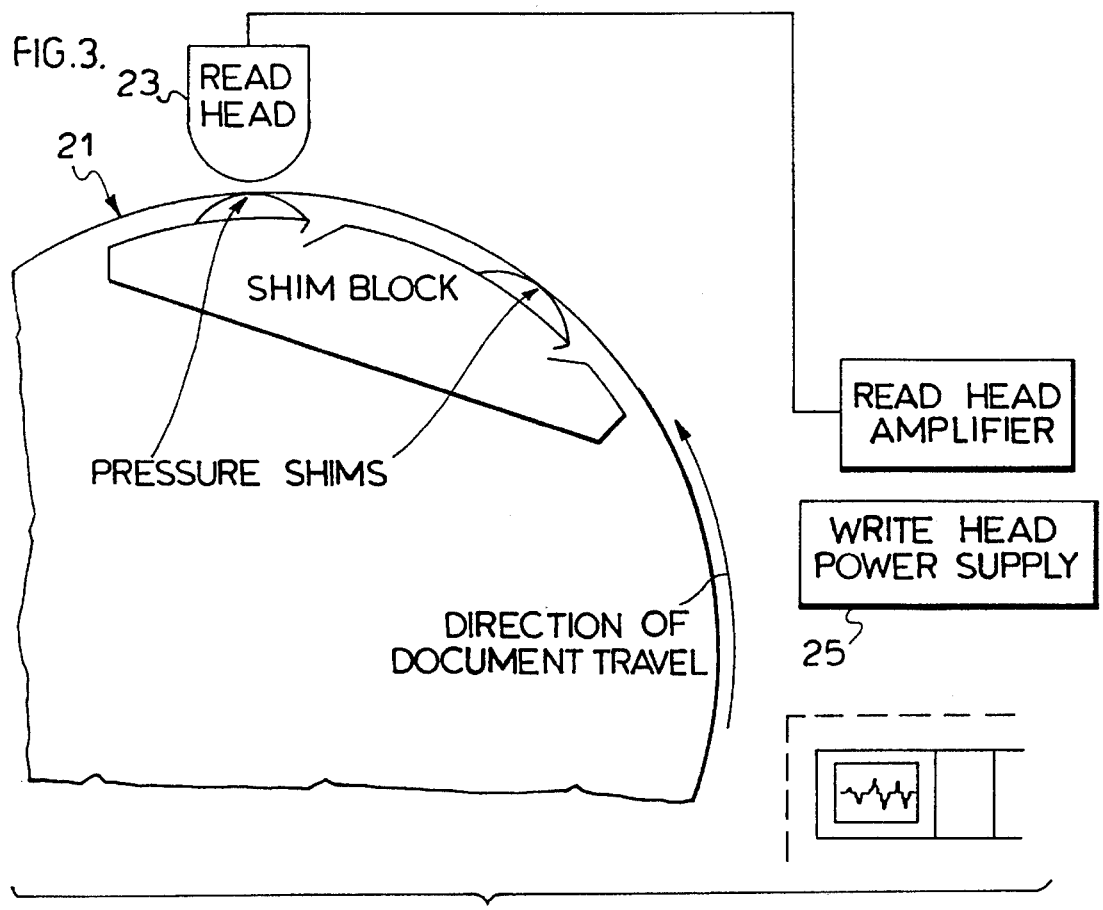
FIG. 3 is a schematic view of the machinery used to measure flux level intensity from the piece of equipment in FIG. 2.
Figure 4:
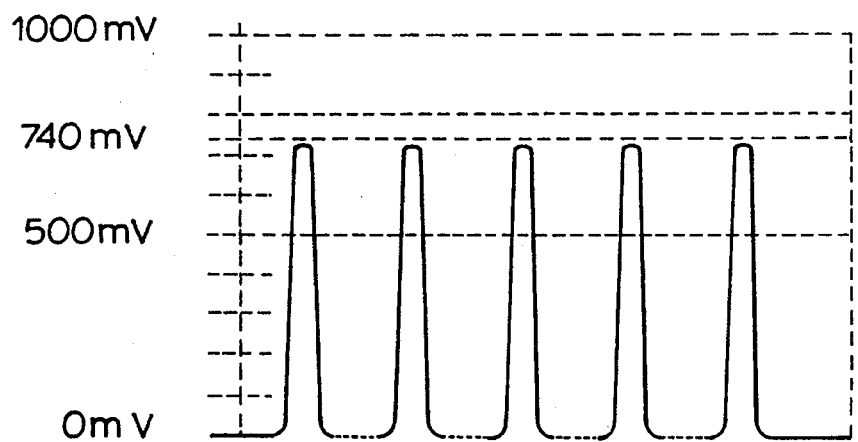
FIG. 4 is a graph showing the signal level provided when using the device of FIG. 2 under controlled conditions to generate a reference value signal.

FIG. 3 shows a magnetic ink testing device generally indicated at 21. This device includes what are known in the industry as a read head 23 and a write head 25. Testing device 21 is used to measure magnetic flux created by the wire card 7 under controlled conditions. The first step in the procedure is to run a current of or about 8.6 mA at 5.77 kHz through the wire and place the wire card on a flat, non-conductive surface near the back of tester 21. Read head 23 is then manually moved over the center of the wire card with the head touching the wire until the maximum signal amplitude is measured on an oscilloscope forming part of the test equipment and not shown. The maximum amplitude of the output sine wave which corresponds to 100% signal level is then recorded. As shown in FIG. 4 of the drawings, the signal level in this case is 740 mV.

Figure 5:
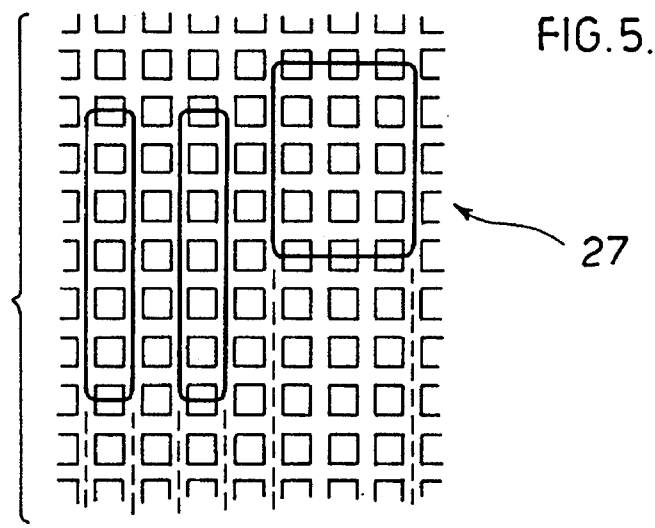
FIG. 5 is a front view of a MICR encoded ON-US symbol.
Figure 6:
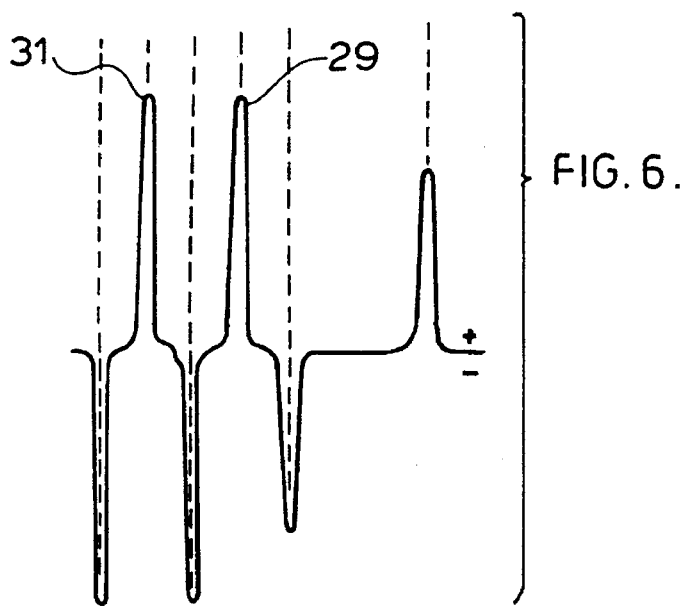
FIG. 6 is a graphic representation of the wave form generated by the ON-US symbol of FIG. 5.

Test equipment 21, in this example, must then be set up to read specifically for the ON-US character which has a signal pattern peculiar to the ON-US symbol. This is because the magnetic pulse generated from a MICR encoded ON-US symbol is proportional to the height of the side of the stroke which is being read. This, as known in the art, is well shown in FIGS. 5 and 6 of the drawings. In particular, FIG. 5 shows an ON-US symbol generally indicated at 27. The characterizing features of the ON-US symbol are that pulses produced because of the shape of the ON-US symbol are maximum at the third and fifth peaks 29 and 31 respectively in the graphic representation shown in FIG. 6 as seen by a magnetic ink reading of the ON-US symbol.

In order to calibrate test equipment 21 specifically to an ON-US symbol reading a reference document having a single ON-US character is fed through the test equipment and the height and rotation of the read and write heads are then adjusted to give a maximum output for the third and fifth peaks of the pulses produced by the ON-US character. It is recommended that several tests be run to ensure accurate set up of the equipment. Furthermore, during each test, the document itself is magnetized by the equipment and should be demagnetized for further testing or measuring purposes. The machine is now ready to test a document having an encoded MICR symbol to be assigned a calibration value.

A calibration document to be assigned a value such as document 1 is fed through the test equipment. The document complies with the test equipment which is designed to receive cheques and the like because as noted above, the document has the shape, size and paper qualities of a standard cheque. The test equipment as also described above is now set up to read for the ON-US symbol. The amplitude of the third and fifth peaks of the pulse produced by the ON-US symbol on the document are then measured. The average of several measurements should be used since there is some variation between tests and some noise generated by the test results.

The relative signal amplitude for the ON-US character 3 on document 1 can now be determined by dividing the average amplitude of the third and fifth peaks read from the ON-US symbol by the maximum amplitude measured with the wire card and multiplying by a factor of 100.

Figure 7:
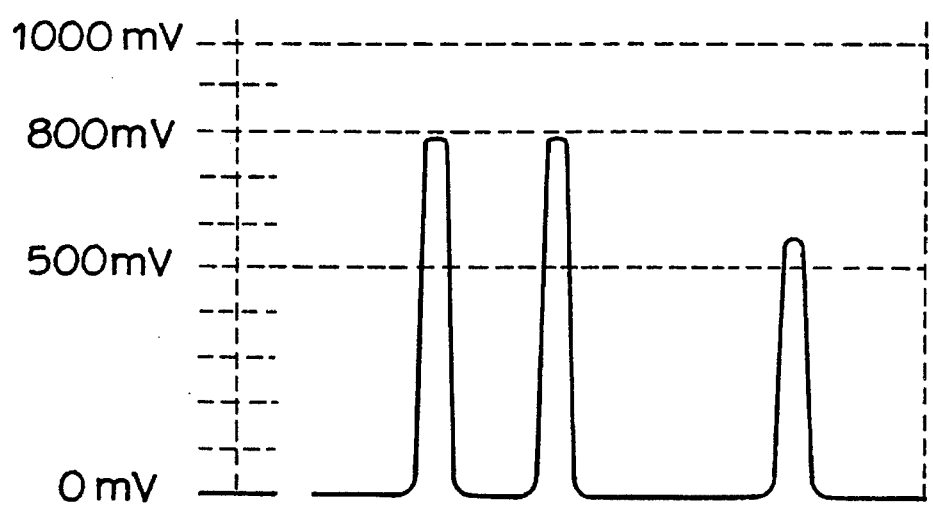
FIG. 7 is a graphic representation of the primary calibration document of FIG. 1 calibrated to a value of 108 relative to the reference value represented by the wave form of FIG. 4.

For example, as shown in FIG. 7 of the drawings, the average amplitude of the third and fifth peaks of ON-US symbol 1 measures at 800 mV. Returning to FIG. 4 of the drawings, the maximum output measured with the wire card is 740 mV. Accordingly, the relative signal strength for the calibration document is 800/740×100= 108% for an assigned value of 108 as shown on document 1.

Document 1 now has an accurately assigned magnetic ink intensity value. This document is then fed to magnetic ink print test equipment (not shown) which is calibrated to correspond with the 108 value on the calibration document. This calibration ensures accuracy of the print test equipment.

From here, printed documents which have a MICR encoded symbol are fed through the test equipment. The test equipment then accurately indicates magnetic ink intensity of those printed documents to determine whether or not they are within a range acceptable to industry standards.

The specific example above relates to calibrating a document based on signal intensity of an ON-US symbol encoded on the primary document. It is however to be understood that other MICR encoded symbols could also be printed on the document and used for calibration purposes. The test equipment would then be set up to read for the particular symbol being calibrated which would have a different pattern from the ON-US symbol pulse and which would therefore require different adjustment for the read and write heads. However, the same principles for assigning a comparitive calibration value would be used.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method of calibrating a document having a magnetic character on said document, said method comprising measuring by testing equipment magnetic flux level of a known current passed through a specified conductor to establish a first signal having a first signal strength represented by a unit value, passing said document through said testing equipment to provide a second signal having a second signal strength produced by magnetic flux of said character and assigning a value to said second signal strength in comparison to and shown in units as a percentage of the unit value of the first signal strength.

2. A method as claimed in claim 1 wherein the first signal strength is represented by a unit value of 100 units and wherein said second signal strength is shown as a percentage of the 100 units representing said first signal strength.

3. A method as claimed in claim 1 wherein said known current is passed through an annealed copper wire of 0.32 millimeters in diameter.

4. A method as claimed in claim 3 wherein said copper wire is secured by tape having a maximum thickness of 0.002 inches to a paper card backing supporting said wire and wherein said paper card backing is placed directly on said test equipment.

* * * * *